UNITED STATES PATENT OFFICE.

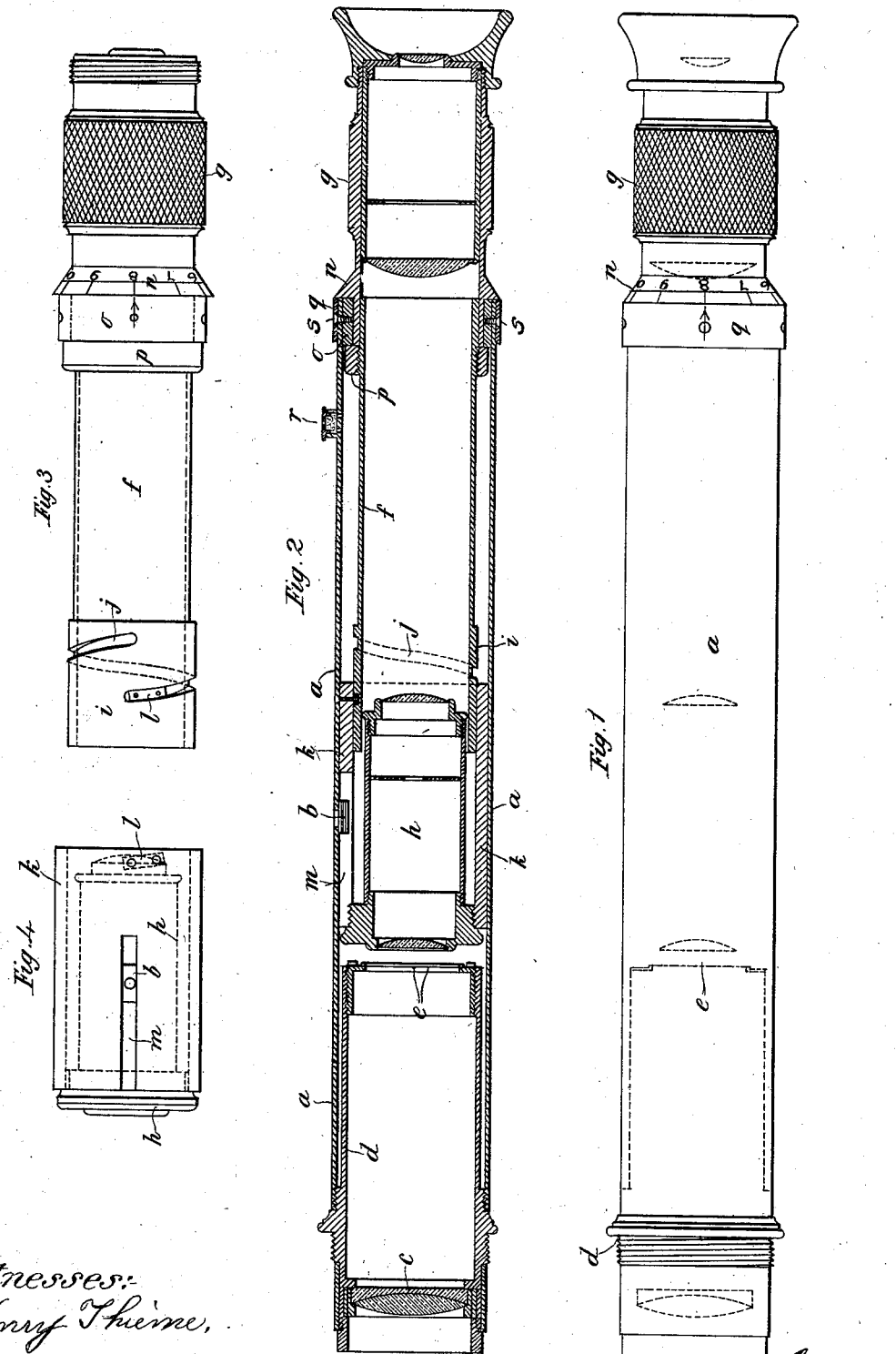

ANDREW AINSLIE COMMON, OF EALING, ENGLAND.

TELESCOPE.

SPECIFICATION forming part of Letters Patent No. 702,048, dated June 10, 1902.

Application filed May 11, 1901. Serial No. 59,717. (No model.)

*To all whom it may concern:*

Be it known that I, ANDREW AINSLIE COMMON, a subject of the King of Great Britain, residing at 63 Eaton Rise, Ealing, in the county of Middlesex, England, have invented new and useful Improvements in Telescopes, of which the following is a specification.

This invention relates to telescopes of the ordinary terrestrial form, to be used more particularly for sighting ordnance where rigidity and strength are important.

In the accompanying drawings, Figure 1 is an external plan view of the improved telescope with the dew-cap removed. Fig. 2 is a longitudinal vertical section of the same. Fig. 3 is a plan view of the eyepiece-tube, and Fig. 4 is a similar view of that part of the eyepiece carrying the third and fourth lenses or the erector detached.

$a$ is the main tube of the telescope, provided internally with a feather or key $b$, the use of which will be presently explained.

$c$ is the object-glass, which is carried by one end of a tube $d$, screwed into the end of the main tube $a$. The other end of this tube $d$ carries the cross-wires $e$, which are thus rigidly mounted with respect to the object-glass, in the principal focus of the same, the tube being of such a length as to permit of this, for with such a low power as is found to be most suitable for sighting purposes no sensible parallax is introduced for any objects over a few yards' distance. The construction of this tube, the mode of effecting the collimation of the object-glasses, and the mode of securing the cross-wires form no part of the present invention, and further reference need not therefore be made to these points, as they may be carried out in any convenient manner.

To the open end of the tube $a$ the eyepiece is secured. This eyepiece is composed of three parts—namely, a tube $f$, an eyepiece proper, $g$, and an erector $h$. The distance between the piece $g$ and the erector $h$ will be made to change, according to the focus required, by turning the piece $g$ from the outside, which operates, by means of a quick-threaded screw or other suitable device, the erector $h$, moving it in or out, so as to vary their relative positions along the axis, thus obtaining the necessary optical correction for difference of sight.

To one end of the tube $f$ is secured in any convenient manner a cylinder $i$, externally of which is cut a spiral groove or quick-threaded screw $j$. Mounted upon this cylinder $i$ is a second cylinder $k$, hereinafter termed the "carrier," which carries internally a projecting piece or pin $l$, which works in the groove $j$. The carrier $k$ is slotted at $m$ and into this slot the feather $b$ on the main telescope-tube $a$ enters, so as to prevent the carrier $k$ from turning around when in use. It will thus be seen that by turning the tube $f$ with its cylinder $i$, Fig. 3, the carrier $k$, Fig. 4, (with the erector $h$, which it carries,) will by reason of the pin or projecting piece $l$, working in the groove $j$ of cylinder $i$, be drawn in or pushed out, as the case may be, thus varying the distance between the erector and the eyepiece proper, $g$.

The eyepiece $g$ consists of an extension of the tube $f$, having an external roughened portion and an eye-shield and carries internally the proper lenses.

The eyepiece $g$ has a beveled portion $n$, which is marked off with a scale (see Figs. 1 and 3) and fits against the end of the tube $a$.

The eyepiece $g$ and the tube $f$ are secured together in any suitable manner, as by sweat-soldering the latter into the former, and the two are connected with the tube $a$, so as to be capable of turning therein, but as to be confined longitudinally thereto, by means of a ring $o$, which is secured within the tube $a$ by screws $s$ between a shoulder formed on the eyepiece and a ring $p$, which is screwed onto the tube $f$. A covering-ring $q$ is represented attached to the outside of the tube $a$, carrying a pointer or mark by which the amount of rotation necessary to get the required focus is indicated, so that any person appointed to sight the arm will be able to focus the telescope to what he knows is his sight number.

$r$ is a device for letting air into the telescope and constituting what I term a "breathing-hole." The device consists of a little box to receive a filtering medium with suitable openings and closed by a small perforated plug or in any other convenient manner.

The joint where the eyepiece-tube $g$ turns in the ring $o$ can be ground in so as to be airtight. The main tube $a$ may be turned accurately cylindrical to fit the sighting apparatus or it may have any suitable fitting for the purpose.

To work the apparatus, the main tube $a$ will be held firmly by the fitting by which the telescope is secured to the gun or by, say, the left hand, and by means of the roughened part the eyepiece will be turned with the other hand. The turning movement will rotate the groove $j$, and thus draw in or push out, as the case may be, the carrier $k$ with the erector $h$, thus varying the distance between the eyepiece and the erector and obtaining the required focus, the number of which indicated by the scale may be noted for future use by the same person.

What I claim as my invention, and desire to protect by Letters Patent, is as follows:

In a telescope, the combination of a main tube, an object-glass fixed at one end of said tube, an eyepiece fitted to turn without moving longitudinally in the opposite end of said tube, an erector, a carrier consisting of a cylinder in which the erector is fixedly secured and which is fitted within the main tube and slotted longitudinally, a feather secured within the main tube and entering the longitudinal slot in the carrier, a tube connected with the eyepiece to turn therewith without moving lengthwise relatively thereto and having on its exterior a spirally-grooved cylinder which is fitted to turn within the carrier, and a piece projecting from and within the carrier and entering the spiral groove of the latter cylinder, all substantially as and for the purpose herein described.

In testimony whereof I have signed my name to this specification in the presence of the two subscribing witnesses.

ANDREW AINSLIE COMMON.

Witnesses:
H. E. NEWTON,
L. N. REDDIE.